US012311620B2

(12) United States Patent
Meyer et al.

(10) Patent No.: US 12,311,620 B2
(45) Date of Patent: May 27, 2025

(54) COMPOSITE PARTS, AND METHODS OF MANUFACTURING

(71) Applicant: Spirit AeroSystems, Inc., Wichita, KS (US)

(72) Inventors: Andi Meyer, Wichita, KS (US); Mark Anthony Wadsworth, Wichita, KS (US); Ronald Jones, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 30 days.

(21) Appl. No.: 18/122,830

(22) Filed: Mar. 17, 2023

(65) Prior Publication Data

US 2024/0308159 A1    Sep. 19, 2024

(51) Int. Cl.
*B29C 70/84* (2006.01)
*B29K 105/08* (2006.01)
*B29L 31/30* (2006.01)

(52) U.S. Cl.
CPC .... *B29C 70/845* (2013.01); *B29K 2105/0881* (2013.01); *B29L 2031/3076* (2013.01)

(58) Field of Classification Search
CPC ....... B29C 70/34; B29C 70/44; B29C 70/545; B29C 70/845; B29D 99/0003; B29D 99/0005; B29D 99/0014; B64C 1/064; B64C 3/26; B29K 2105/0881; B29L 2031/3076

See application file for complete search history.

(56) References Cited

U.S. PATENT DOCUMENTS

| 10,744,722 | B2 | 8/2020 | Rossi et al. |
| 2018/0297347 | A1* | 10/2018 | Kisch .................... B32B 37/142 |
| 2024/0308159 | A1* | 9/2024 | Meyer ...................... B64C 3/26 |

FOREIGN PATENT DOCUMENTS

| AU | 2014203585 A1 | 5/2015 |
| EP | 3138769 A1 | 3/2017 |

OTHER PUBLICATIONS

Search Opinion of EP4431268.*
Search Report of EP4431268.*
European Search Report, Europe Patent Application No. 24163594.5, dated Aug. 13, 2024, 9 pages, European Patent Office, Munich, Germany.

* cited by examiner

Primary Examiner — Sonya M Sengupta
(74) Attorney, Agent, or Firm — Stinson LLP

(57) ABSTRACT

A method for manufacturing a composite part includes forming an initial radius filler on a composite panel. The initial radius filler is formed from a plurality of plies of composite material stacked on the composite panel. The method includes forming a radius of curvature on at least one side of the initial radius filler, positioning a composite stiffener on the composite panel, wherein the composite stiffener is contoured to define a radius gap when joined with the composite panel, positioning the composite stiffener against the at least one side of the initial radius filler, compressing the composite stiffener, composite panel, and initial radius filler via vacuum bag, and heating the initial radius filler to at least one of a cure temperature, a melting temperature, or a fusing temperature to form, from the initial radius filler, a radius gap filler in the radius gap.

12 Claims, 9 Drawing Sheets

COMPOSITE PARTS, AND METHODS OF MANUFACTURING

BACKGROUND

The manufacture of structural aircraft structures from layers of composite materials, fiber-reinforced or otherwise, is accomplished using a number of known techniques. For example, many composite parts are made of unidirectional tape in an automated fiber placement (AFP) process. This process includes placing individual layers (plies) of uncured or unfused composite pre-impregnated unidirectional tape on contoured tooling with an AFP machine. With composite parts such as a skin panel, the layers are first laid up and consolidated prior to laying up of any substructure that may be fixed to the skin panel. Following consolidation, the substructure may be positioned on the skin panel and the combination placed in an oven or autoclave for application of heat and fusing of the substructure to the skin.

Stringers are a type of substructure that is constructed separately from and then attached to the skin panel described above. A composite filler manufactured separately from the stringer is sometimes positioned at the radius bond line between the stringer and the skin panel. The composite filler is often in the form of triangular cross-sectional strips, sometimes referred to as noodles or fillers, which fill the void at the radius bond line. Installation of the fillers involves frequent trips between workpiece and workbench to retrieve noodles, correctly positioning the fillers in the void space, and splicing adjacent fillers to each other within the void space. Careful handling is necessary to avoid distorting the filler shape or entangling the fillers. Consequently, the filler making, handling, and installation processes can be very time-consuming and labor-intensive for larger structures.

SUMMARY

A method of manufacturing a composite part in accordance with an embodiment of the invention includes forming an initial radius filler on a composite panel. The initial radius filler is formed from a plurality of plies of composite material stacked on the composite panel. The method further includes forming a radius of curvature on at least one side of the initial radius filler, positioning a composite stiffener on the composite panel, wherein the composite stiffener is contoured to define a radius gap when joined with the composite panel, positioning the composite stiffener against the side of the initial radius filler, compressing the composite panel and the composite stiffening member together via consolidation pressure, and heating the initial radius filler to at least one of a cure temperature, a melting temperature, or a fusing temperature to form, from the initial radius filler, a radius gap filler in the radius gap.

A composite part in accordance with another embodiment includes a composite panel and a composite stiffener joined with the composite panel, wherein the composite stiffener is contoured to define a radius gap when joined with the composite panel. The composite part further includes a radius gap filler in the radius gap. The radius gap filler is formed from a plurality of plies of composite material stacked on the composite panel.

In yet another embodiment, a method of manufacturing a composite part includes determining an install location for at least one stiffener on a composite panel and forming an initial radius filler at the install location on the composite panel, wherein the initial radius filler is formed from a plurality of plies of composite material. The method further includes positioning a composite stiffener on the composite panel, wherein the composite stiffener is contoured to define a radius gap when joined with the composite panel. The method further includes using the initial radius filler to position the composite stiffener at the install location, compressing the composite panel and the composite stiffening member together via consolidation pressure, and heating the initial radius filler to at least one of a cure temperature, a melting temperature, or a fusing temperature to form, from the initial radius filler, a radius gap filler in the radius gap.

This summary is intended to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in more detail below with reference to the attached drawing figures, wherein.

Figure 1:
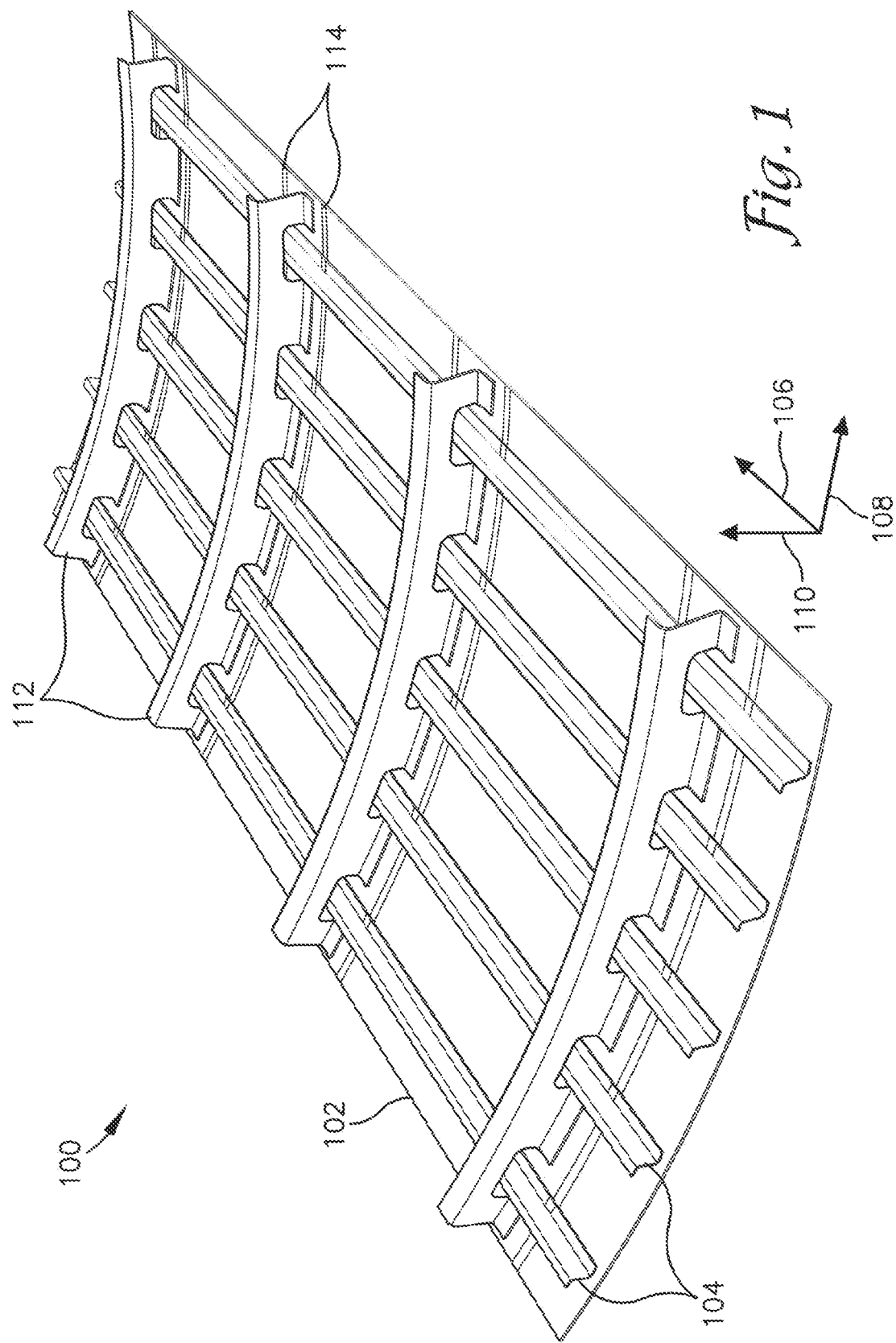
FIG. 1 is a perspective view of an example composite part.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Typically, the joint between a stiffening element and a skin panel forms a gap between the small radius of the stiffener's corner and the larger radius of the skin panel. If the stiffener and the skin panel are processed simultaneously, such as via co-curing or co-fusion, the diminishing gap limits the transfer of bag pressure through the thickness of the parts locally, resulting in a region of low pressure. For most composite applications where an out-of-plane joint is present, this region is filled with a radius filler (also called noodle or gusset filler).

The radius filler can be made of composite, adhesive, or other process compatible material. These materials are typically uncured, flexible, and tacky. Accordingly, some radius fillers are pre-formed to the shape of the radius gap and are introduced after the stiffener has been located on the skin. The radius filler is shaped to conform to the gap and its tackiness sometimes used to hold the radius filler in place. However, this can be difficult with thermoplastics processing because of the rigid nature of thermoplastics at room temperature. For example, it can be difficult to bend the radius filler to conform and locate it in a precise location between the stiffener and the skin panel. Tooling and/or templates are also used to precisely locate stiffeners on the skin panel prior to positioning of a radius filler in respective radius gaps. This tooling and/or template process adds additional time and expense to the manufacturing process.

Thus, a need exists for an improved method of fabricating and locating radius filler noodles and associated stiffeners.

A method in accordance with embodiments of the invention fabricates radius noodle fillers in the same process as the skin panel plies while still on a fiber placement tool. The method manufactures largely consolidated fillers made of thermoplastic materials, for example, that conform to compound contours of the skin panel as a result of the fiber placement process. In contrast, other known fillers would normally be too rigid to be conformed to compound contours if pre-consolidated to a generic shape. The method also uses the radius noodle fillers as means to precisely locate the stiffeners at predetermined locations on the skin panel.

The method uses an automated fiber placement (AFP) machine to place the plies for the skin panel, and to build up radius noodle fillers in precise locations on the skin panel, on the same fiber placement tool. Since the fiber placement tool is already in position relative to the AFP machine, the location of previously built features on the skin panel is known and stored in the machine's memory. This enables the radius noodle fillers to be precisely located on the skin panel without having to use a different machine. In addition, this build-up of additional plies provides the material to fill any radius gaps and provides a locating feature for any stiffeners on the skin panel.

In some embodiments, because plies of the radius noodle filler are applied in the same process as plies of the skin panel, some of the filler buildup plies may be buried within the skin. That is, the composite pre-form may be manufactured by interchanging some of the filler plies and the skin panel plies in the ply laydown process. This configuration facilitates softening the buildup modulus and reducing the likelihood of a crack forming and propagating through the entire filler.

In some embodiments, either or both sides of the filler buildup structure can be machined into a shape that is different from the initial laydown shape. This results in a size-reduction that provides improved positional accuracy of the stiffeners against the fillers and/or reduces the weight of the remaining filler material. The resulting radius filler provides pressure transfer to the skin as well as an indexing location to assist in the assembly of the stiffeners on the skin panel.

In some embodiments, the skin surface is uneven from skin thinning and/or from the presence of raised features, such as from strengthening plies incorporated with the skin and oriented crosswise from the stiffeners. The rigidness of known fillers can make it difficult to accurately locate the fillers across these features on the skin surface. Using the AFP machine to place flexible strips of composite across the skin panel enables the resulting radius filler to be shaped to the skin surface.

Referring now to the drawings, as depicted in FIG. 1, a composite part 100 includes a skin panel 102 and a plurality of stiffeners 104 joined with the skin panel 102, as will be described in more detail below. The composite part 100 is a three-dimensional structure defined by a length dimension 106, a transverse dimension 108, and a thickness dimension 110. When joined with the skin panel 102, the stiffeners 104 are spaced from each other and oriented in the length dimension 106 on the skin panel 102. The composite part 100 also includes transverse stiffeners 112, and a strengthening member 114 on either side of each of the transverse stiffeners 112.

Figure 2:
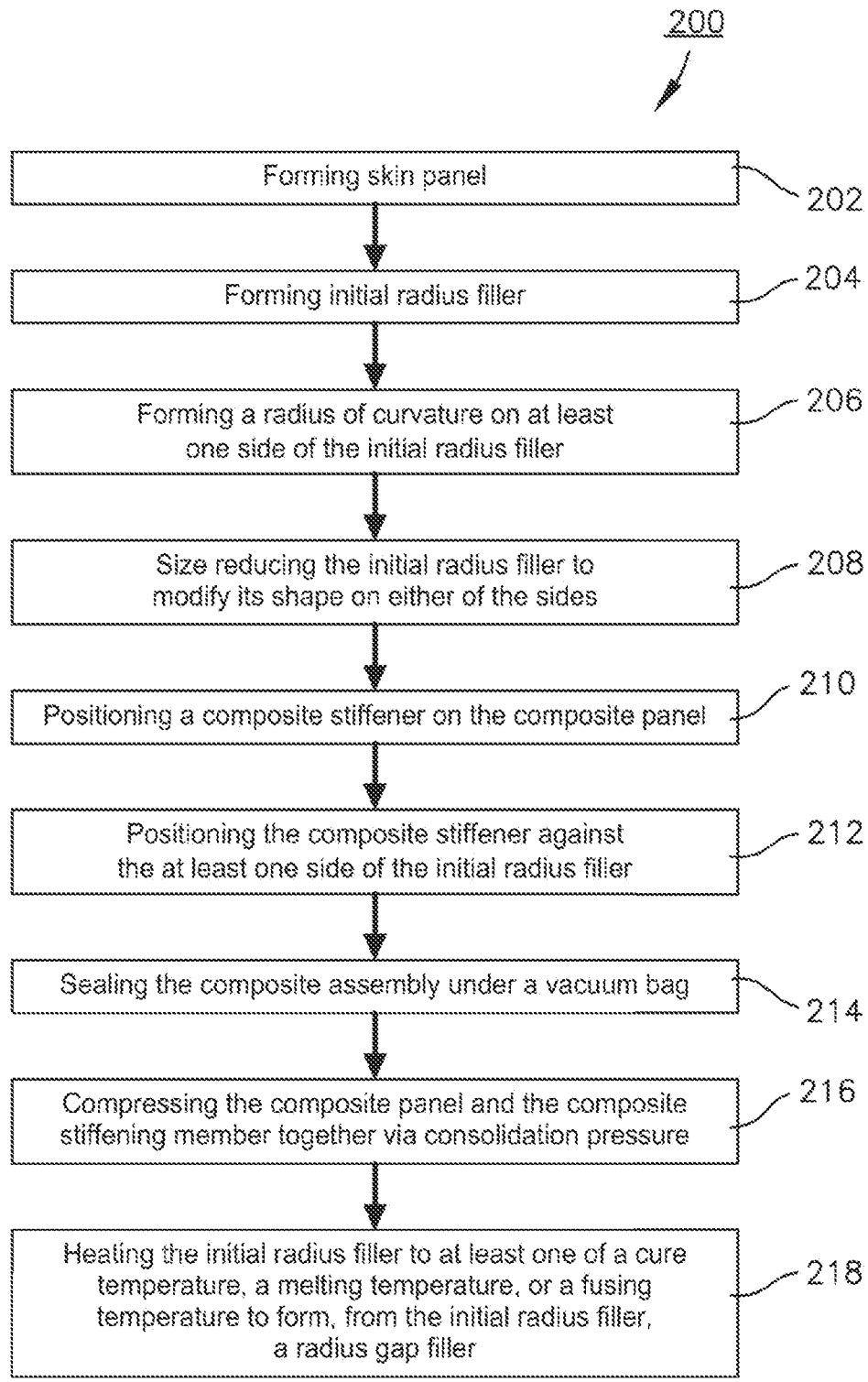
FIG. 2 is a flow diagram illustrating an example method of manufacturing a composite part.

The flow chart of FIG. 2 depicts a method 200 for manufacturing the composite part 100 or other such composite parts in more detail. In some embodiments of the invention, various steps may be omitted and/or steps may occur out of the order depicted in FIG. 2 without departing from the scope of the invention. For example, two blocks shown in succession in FIG. 2 may in fact be executed substantially concurrently, or blocks may sometimes be executed in the reverse order depending upon the functionality involved.

Some of the method 200 steps are likewise illustrated in FIGS. 3-9, which are front sectional views each depicting an example method step for manufacturing a portion of the composite part 100, such as with an AFP machine 116. AFP machine 116 generally includes a gantry/robotic system (not shown) having a fiber placement head 118 attached thereto. The AFP head 118 enables multiple strips of composite material, or tows, to be laid onto a fiber placement tool 120, which is contoured to the desired shape of the skin panel 102 (e.g., planar or non-planar). Adhesion between the incoming tows and underlying substrate is provided by using appropriate process conditions with respect to heating, compaction, and tensioning. A series of tows forms a course, courses are then combined to produce a ply, and multiple plies produce a laminate.

Figure 3:
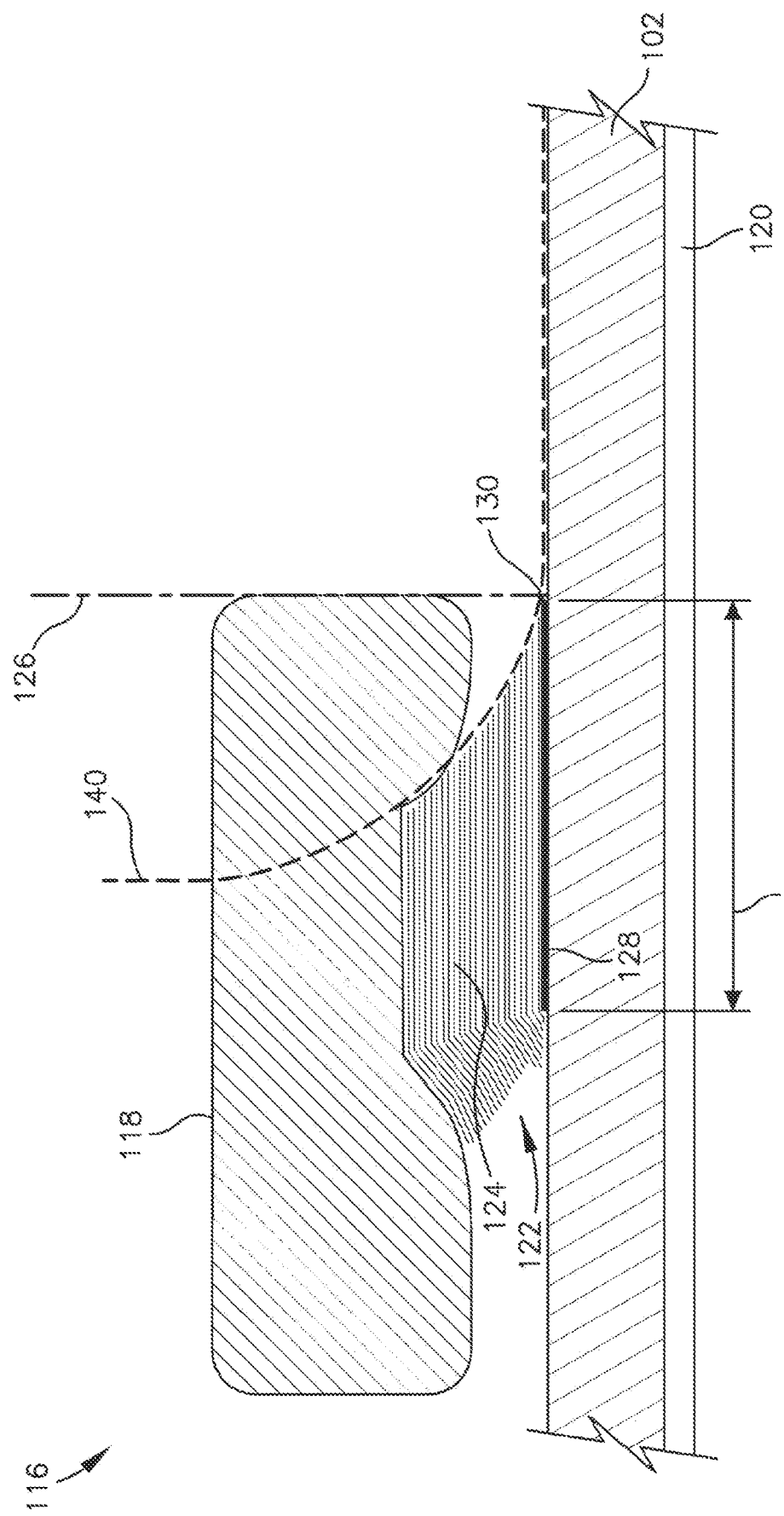
FIG. 3 is a front sectional view illustrating initial radius filler buildup on a placement tool.

As depicted in FIG. 2, the method 200 can include the steps of forming the skin panel 102, as depicted in block 202, and forming an initial radius filler 122, as depicted in block 204. For example, as depicted in FIG. 3, the skin panel 102 is formed on the fiber placement tool 120 and then the initial radius filler 122 is formed on the skin panel 102. That is, the skin panel 102 and the initial radius filler 122 are co-formed from plies of composite material on the same tool. In some embodiments, the composite material comprises a reinforcement fiber and a thermoplastic or thermosetting matrix resin. For example, the thermoplastic matrix resin can be one or more of: polyaryletherketone (PAEK), polyetherketoneketone (PEKK), polyetheretherketone (PEEK), polyphenylene sulfide (PPS), Polyethylenimine (PEI), and the like. The matrix resin of the thermoplastic composite panel can be semi-crystalline or amorphous upon cooling in accordance with one or more of the method steps later described herein.

In one or more embodiments, the step of forming the initial radius filler 122 includes performing automated fiber placement of a plurality of plies 124 of composite material stacked on the skin panel 102. In general, AFP machines are capable of laying down 8-16 individual tows at a time from respective applicators. As described herein, the AFP machine 116 is capable of selectively deactivating its applicators to enable an individual tow to be dispensed from the AFP head 118. In some embodiments, the initial radius filler 122 is formed from the plurality of plies 124, which are continuous strips of composite material dispensed from the AFP head 118.

In some embodiments, the initial radius filler 122 is formed at an install location 126 for a stiffener (such as the stiffener 104 shown in FIG. 1) on the skin panel 102. For example, the step 204 of forming an initial radius filler 122 can further comprise determining an install location for the stiffener 104, and forming the initial radius filler 122 at the install location on the skin panel 102. The install location 126 is defined based on the schematics of the composite part 100, and the locations on the skin panel 102 that require reinforcement and/or stiffening to meet design specifications. Accordingly, when the AFP machine 116 is used, the install location 126 is a predetermined location on the skin panel 102 that is stored in a memory of the AFP machine 116.

In one or more embodiments, the AFP head 118 forms the initial radius filler 122 by laying down a first ply 128 of composite material at the install location 126. Specifically, the first ply 128 is laid down such that a side edge 130 thereof is positioned at the install location 126 on the skin panel 102. Additional ones of the plies 124 of composite are then stacked on the skin panel 102 over the first ply 128. The side edges 130 of the stacked plies 124 thus provide a point of contact for abutting against the stiffener 104 to locate the stiffener 104 at a desired location on the skin panel 102.

Figure 4:
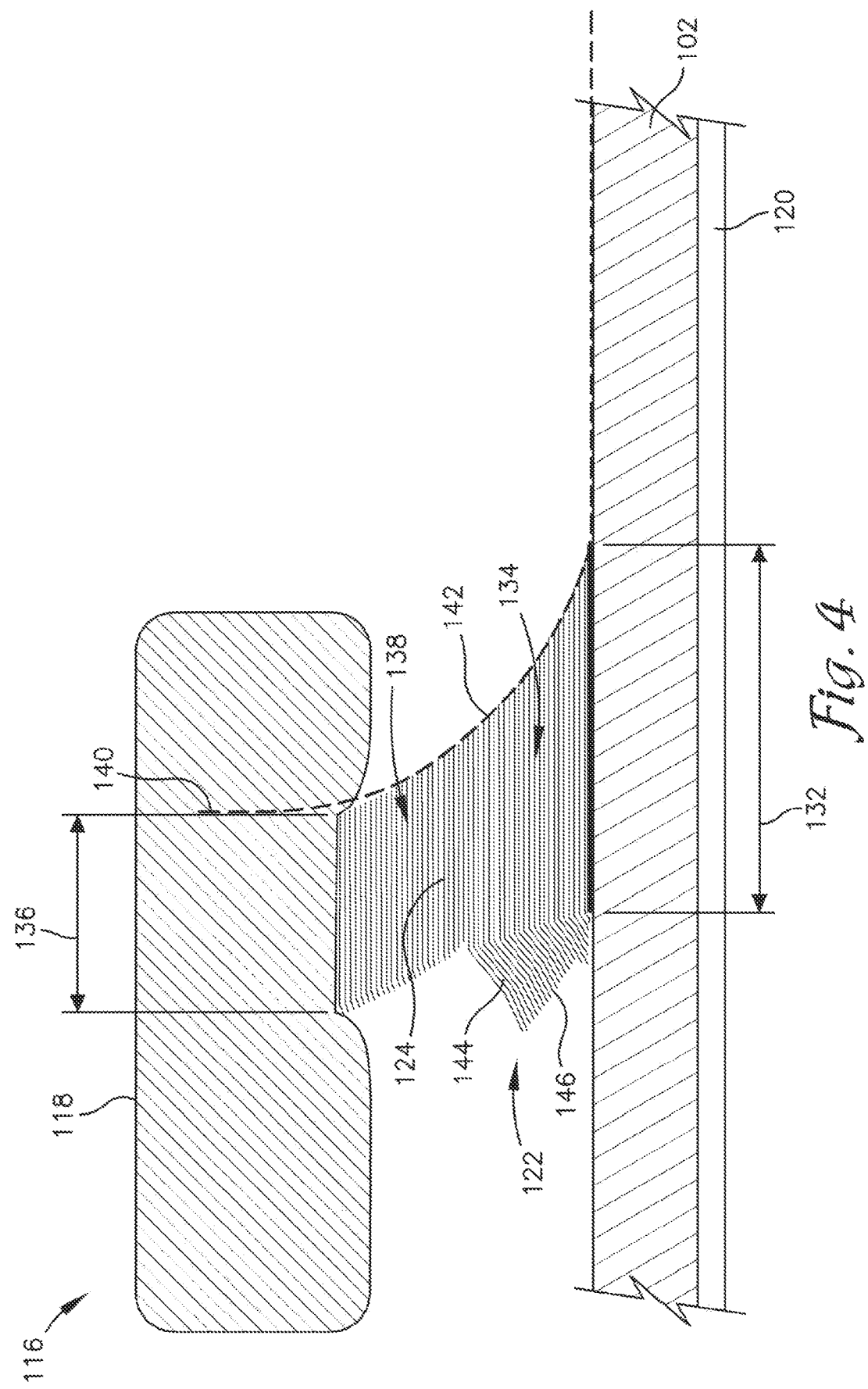
FIG. 4 is a front sectional view illustrating further initial radius filler buildup on the placement tool.

As depicted in FIG. 2, the method 200 further includes a step of forming a radius of curvature on at least one side of the initial radius filler, as depicted in block 206. Specifically, as depicted in FIGS. 3 and 4, the plies 124 of a first width 132 are stacked on skin panel 102 to form a first stack 134. Then, as depicted in FIG. 4, the plies 124 of a second width 136 are stacked on first stack 134 to form a second stack 138. At least one ply, and typically each successive ply, is stacked at an offset from one another on skin panel 102. Specifically, each of the plies 124 is laid down at a greater transverse distance from install location 126 from the previously laid ply. This staggered stacking forms a radius of curvature 140 on one side 142 of initial radius filler 122. Radius of curvature 140 is shaped to align with contours of a stiffener 104 to be positioned against initial radius filler 122. Accordingly, the laydown location of each successive one of the plies 124 is selected to define a radius of curvature 140 that facilitates the indexing and consolidation of stiffener 104 at install location 126.

Figure 9:
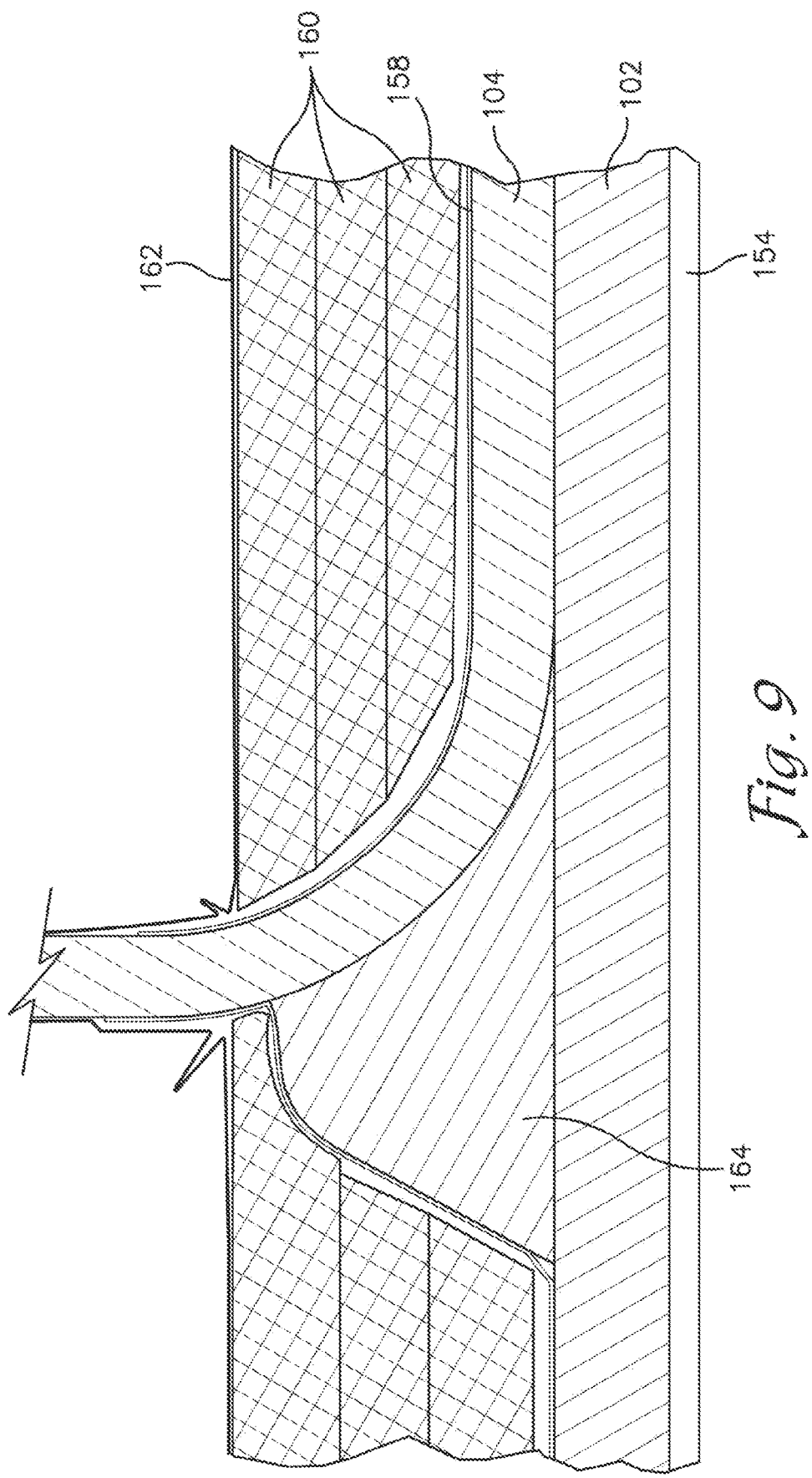
FIG. 9 is a front sectional view illustrating co-formation of the composite part after consolidation.

In some embodiments, the AFP machine 116 is capable of dispensing plies of a fixed width onto the fiber placement tool 120. Accordingly, the staggered stacking of the plies 124 forms the radius of curvature 140 and also forms an excess material buildup 144 on the opposing side 146 of the initial radius filler 122, as depicted in FIG. 4. The excess material buildup 144 can increase the weight of the composite part 100. As depicted in FIG. 4, the excess material buildup 144 is limited by stacking the plies 124 of the first width 132 on the skin panel 102 to form the first stack 134, and then stacking the plies 124 of the second width 136 on the first stack 134 to form the second stack 138. The first width 132 is greater than the second width 136. Thus, stacking plies of the reduced second width 136 on the first stack 134 facilitates limiting the size of the excess material buildup 144 while still providing sufficient material volume for producing a stable radius gap filler 164 (as depicted in FIG. 9 and later described herein).

Figure 5:
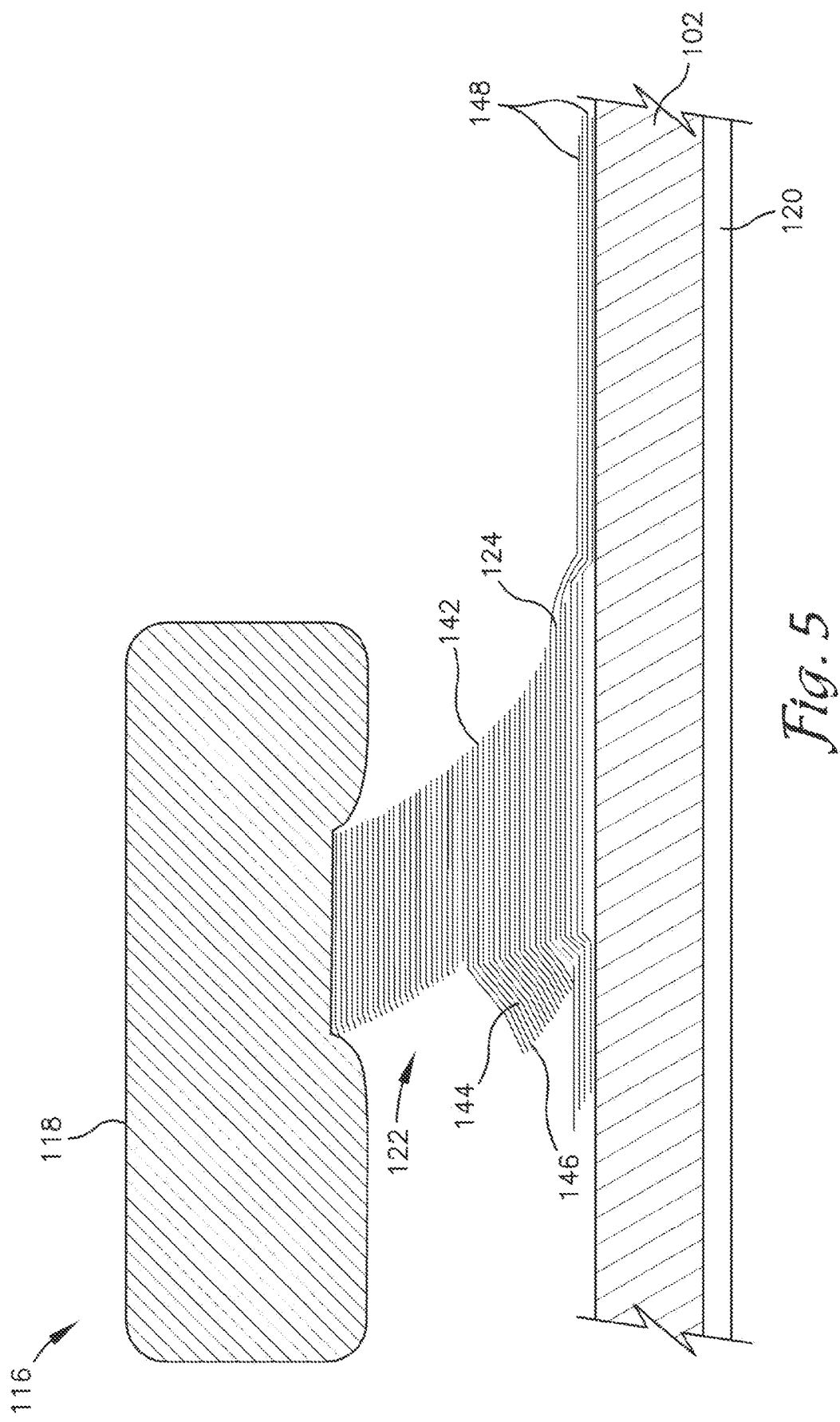
FIG. 5 is a front sectional view illustrating skin panel and filler ply integration, in accordance with one embodiment of the present invention.

As depicted in FIG. 5, an alternative embodiment of the steps 202-206 includes the AFP machine 116 laying down plies of the skin panel 102 and of the initial radius filler 122 in an alternating manner. This laydown process produces a pre-form structure wherein at least one of the plies 124 of the initial radius filler 122 is positioned between two plies 148 of the skin panel 102. This configuration softens the buildup modulus and reduces the likelihood of a crack forming and propagating through the entire filler.

In the various embodiments described herein, the plies 124 and 148 contain a reinforcement material, such as fibers oriented in one or more dimensions within the plies. As described above, the AFP machine 116 dispenses continuous strips of composite material to produce the plies 124 and 148. In one embodiment, the plies 124 and 148 contain fibers oriented unidirectionally therein. In one embodiment or in combination with any embodiments described herein, the plies 124 and/or the plies 148 are laid to orient the fibers in each respective sub-part unidirectionally relative to each other. In one embodiment or in combination with any embodiments described herein, at least one of the plies 148 of the skin panel 102 and at least one of the plies 124 of the initial radius filler 122 have different fiber orientations relative to each other. For example, in one embodiment, the plies 148 of skin panel 102 are oriented in the transverse dimension 108 (shown in FIG. 1) of the composite part 100, and the plies 124 of the initial radius filler 122 are oriented in the length dimension 106 (shown in FIG. 1) of the composite part 100.

In one embodiment or in combination with any embodiments described herein, all of the plies 124 of the initial radius filler 122 are oriented in the length dimension 106 (shown in FIG. 1) of the composite part 100. In one embodiment or in combination with any embodiments described herein, at least one of the plies 124 of the initial radius filler 122 has a different fiber orientation relative to the other of the plies 124 of the initial radius filler 122. For example, the at least one of the plies can have a 90° or a 45° fiber orientation relative to the length dimension 106 when placed on the fiber placement tool 120.

Figure 6:
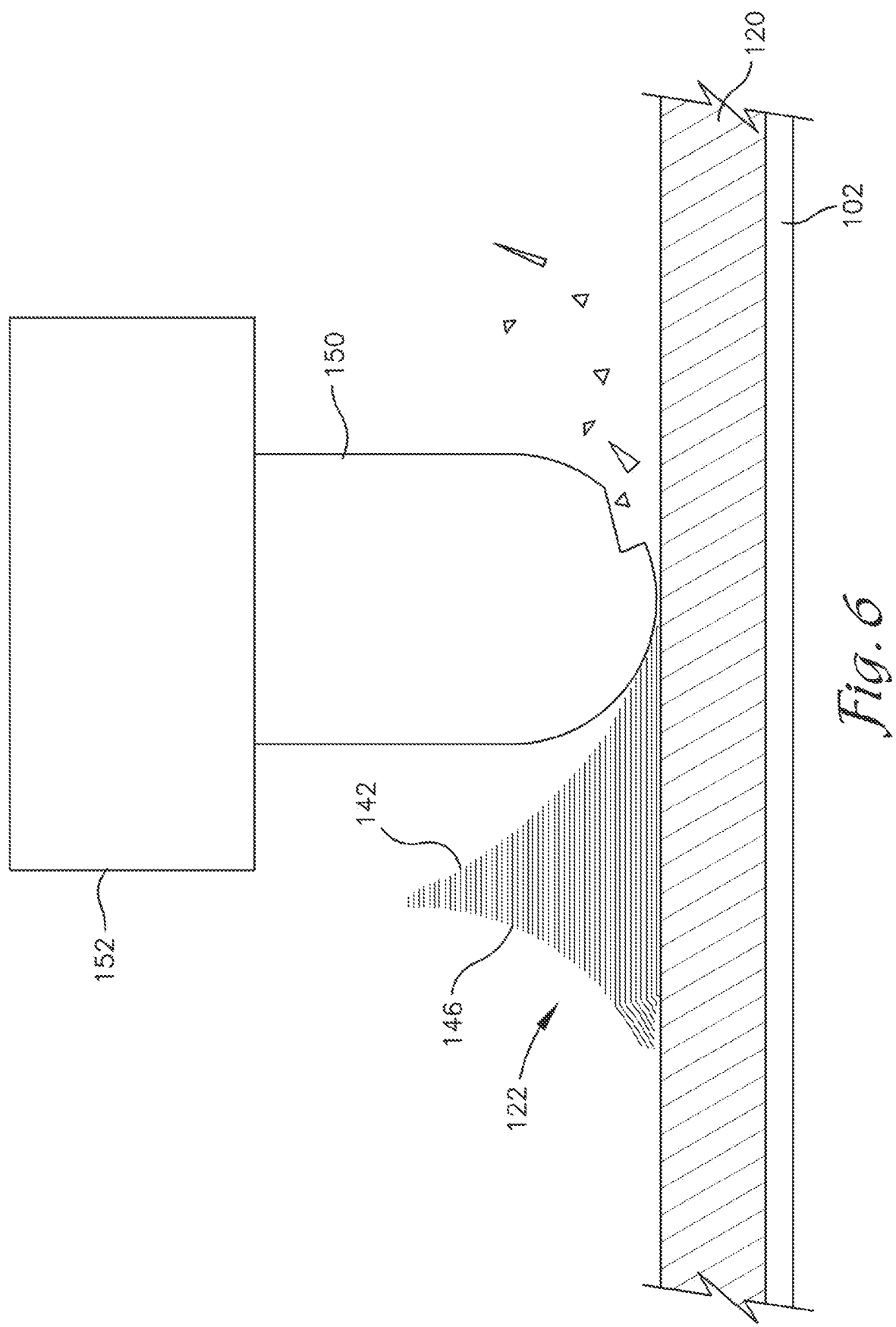
FIG. 6 is a front sectional view illustrating size-reduction of the initial radius filler.

As described above, the staggered stacking of the plies 124 forms the radius of curvature 140 on the side 142 of the initial radius filler 122. One or more embodiments of the method 200 optionally includes a step of size-reducing the initial radius filler 122 to modify its shape on either of the sides 142 or 146, as depicted in block 208. Specifically, the shape may be modified to provide additional precision to the radius of curvature 140 or modified to size-reduce the initial radius filler 122 into a significantly different shape. For example, as depicted in FIG. 6, the initial radius filler 122 is size-reduced to more accurately shape the side 142 to match the contours of an adjoining one of the stiffeners 104 (see FIG. 1). This size-reduction generally removes a small amount of material from the initial radius filler 122 because of the staggered stacking of the plies 124. In addition, the initial radius filler 122 is size-reduced to remove at least a portion of the excess material buildup 144 from the initial radius filler 122. This size reduction may be performed to reduce the weight of the composite part 100 or, as depicted in FIG. 6, to shape the side 146 to match the contours of an adjoining one of the stiffeners 104 (i.e., form a full noodle). This size-reduction removes a comparatively larger amount of material from the initial radius filler 122 than the shaping to provide additional precision to the radius of curvature 140.

In one embodiment, as depicted in FIG. 6, the initial radius filler 122 is size-reduced mechanically, such as with a cutter 150 on a rotating spindle 152. Example cutters include, but are not limited to, ball nose cutters and flat head cutters depending on the desired final shape of the initial radius filler 122 before consolidation (e.g., half noodle, full noodle, or an irregular shape).

Figure 7:
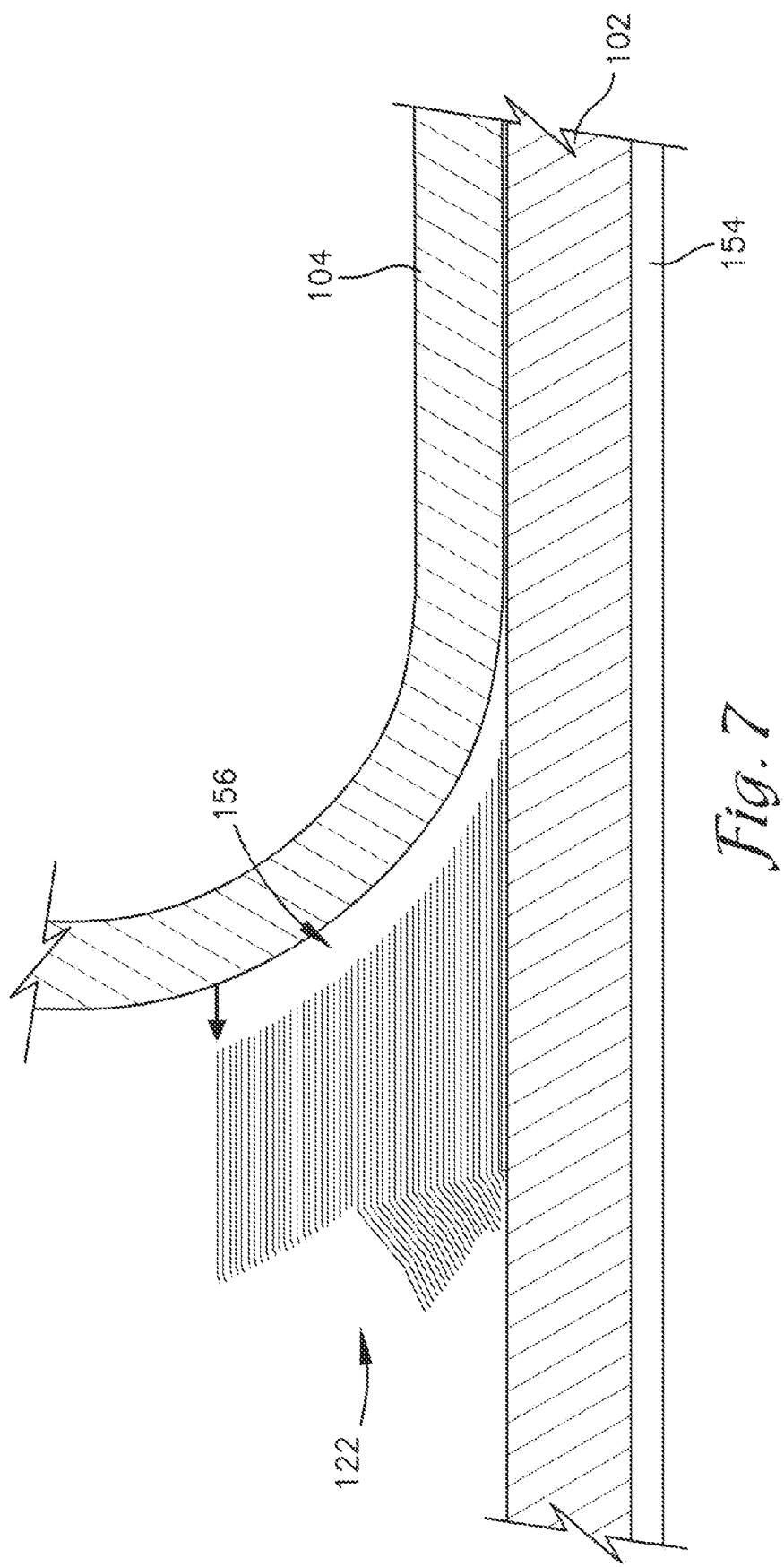
FIG. 7 is a front sectional view illustrating stiffener positioning relative to the initial radius filler.

The method 200 further includes the steps of positioning a composite stiffener on the composite panel, as depicted in block 210, and positioning the composite stiffener against the at least one side of the initial radius filler, as depicted in block 212, thereby using the initial radius filler to position the composite stiffener at the install location. Specifically, as described above, the skin panel 102 and the initial radius filler 122 are co-formed on the same fiber placement tool 120. Then, as depicted in FIG. 7, once the skin panel 102 and the initial radius filler 122 are formed, the sub-parts are removed from the fiber placement tool 120 and located on a consolidation tool 154. On the consolidation tool 154, the stiffener 104 is positioned on the skin panel 102 and then positioned against the side 142 of the initial radius filler 122. The stiffener 104 is contoured to define a radius gap 156 when joined with the skin panel 102. As described above, the initial radius filler 122 is shaped to align with the contours of the stiffener 104. Accordingly, at least a portion of the initial radius filler 122 is positioned within the radius gap 156 when the stiffener 104 is positioned against the initial radius filler 122. The initial radius filler 122 is thus positioned to fill the radius gap 156 as needed when heat and pressure are applied in a subsequent consolidation process.

In some embodiments, the step depicted in block 212 can further include fastening the stiffener 104 to the skin panel 102, once positioned against the initial radius filler 122, in preparation for consolidation. The fastening is accomplished with at least one of mechanical fasteners, welding tape straps, ultrasonic melting, and the like.

Figure 8:
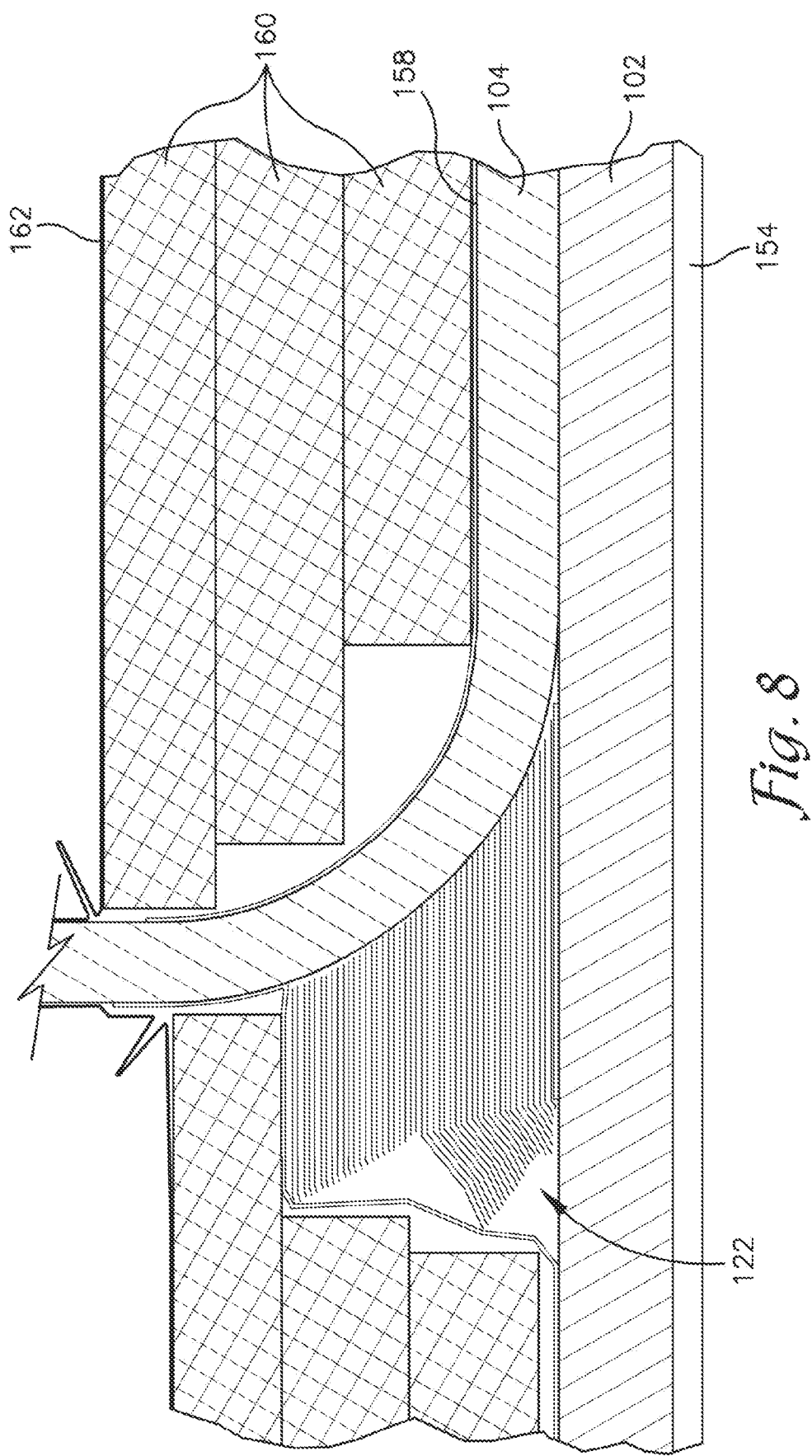
FIG. 8 is a front sectional view illustrating co-formation of a composite part prior to consolidation.

The method 200 may also include the steps of sealing the composite assembly under a vacuum bag, as depicted in block 214, and compressing the composite panel and the composite stiffening member together via consolidation pressure, as depicted in block 216, such as by applying a pressure differential to the vacuum bag. For example, as depicted in FIG. 8, a release film 158 may first be applied over any portion of exposed parts that will be consolidated from individual plies, including the skin panel 102 and the initial radius filler 122. One or more layers of insulation 160 may also be applied over the skin panel 102, as depicted in FIG. 8, leaving at least a portion of the stiffener 104 exposed.

Then, as depicted in FIG. 9, a vacuum bag 162 may be applied over the assembly, including the skin panel 102, the initial radius filler 122, the stiffener 104, the release film 158, and the layers of insulation 160. The vacuum bag may be any flexible, impermeable membrane configured for sealing around the composite assembly and may be actuated to compress the thermoplastic composite panel or the plies thereof via a pressure differential (e.g., pulling vacuum via a port formed through the vacuum bag). For example, compressing a composite assembly can include surrounding it with a bag (e.g., the vacuum bag 162) and reducing pressure within the bag via vacuum, autoclave, and/or the like, thus accomplishing the step of block 216. Other methods of introducing a pressure differential to compress the vacuum bag for consolidation of the composite assembly known in the art can be used without departing from the scope of the technology described herein.

The method 200 also includes a step of heating the initial radius filler to at least one of a cure temperature, a melting temperature, or a fusing temperature to form, from the initial radius filler, a radius gap filler in the radius gap, as depicted in block 218. For example, in some embodiments, the composite assembly, including the initial radius filler 122 is heated to a temperature defined within a range of 250-700° F. The composite assembly can be heated with a heat plate, an oven, a handheld manual heat source via an operator or a robotic arm (not shown), or other sources of heat controllable for thermoplastic and/or thermosetting composite heating known in the art. The heat source can generate and provide at least one of radiant, convection, resistance, induction, or other similar types of heat that are suitable for heating the composite material.

When the composite assembly is heated to temperature, the composite material flows under the bag pressure and the skin panel 102, the initial radius filler 122, and the stiffener 104 are co-consolidated to form a unitary structure. Although bag pressure is disclosed herein for compressing the skin panel 102 and the stiffener 104 together or against each other, note that other methods of applying consolidation pressure can be used without departing from the scope of the technology herein. In this process, the initial radius filler 122 is used to transfer pressure into the area underneath the radius gap 156. In addition, heating the initial radius filler 122 to temperature consolidates the individual plies 124 of the initial radius filler 122 and converts the initial radius filler 122 to a radius gap filler 164, as depicted in FIG. 9.

Although the invention has been described with reference to example embodiments illustrated in the attached drawing figures, it is noted that equivalents may be employed, and substitutions made herein without departing from the scope of the invention as described and claimed herein.

For instance, it should be noted that composite parts are typically formed from composite material, as is known in the art, which generally includes at least two constituent components—a reinforcement material and a matrix material. The reinforcement material generally provides mechanical strengthening properties, such as high tensile strength, to the composite material, while the matrix material acts as a binder to hold the reinforcement material together. The reinforcement material and the matrix material may possess additional properties not discussed herein. Furthermore, the composite material may include additional components not discussed herein.

Examples of reinforcement materials that may be used with the current invention include, but are not limited to, fiber materials such as carbon fiber, boron fiber, fiberglass, aramid fiber, ceramic fiber, and the like without departing from the spirit of the present invention. In the case of fiber-based reinforcement materials, the fiber may exist in one of at least two forms—either preimpregnated (prepreg), in which the fiber may be coated with a matrix material that is uncured and/or requires further heat treatment, such as uncured resin or thermoplastic polymer, or as dry fiber, with no matrix material incorporated prior to part manufacture. The matrix material may typically be in the form of thermoplastic polymers such as polycarbonates, polyamides, polyphenylene sulfide, polyetherimide, polyetheretherketone, polyetherketoneketone, and the like. The matrix material may also or alternatively be in the form of thermosetting polymer resins, such as epoxies, bismaleimides, vinyl esters, phenolics, polyimides and the like, among others. It should be noted that thermoplastic film adhesives are preferably incorporated between parts comprising thermosetting matrix materials, and that fixing one such part to another includes curing the thermoplastic film adhesives. It should also be noted that mixtures of composite materials may be used to form a single composite part without departing from the spirit of the present invention.

The invention claimed is:

1. A method of manufacturing a composite part, the method comprising:
   forming an initial radius filler on a composite panel, wherein the initial radius filler is formed from a plurality of plies of composite material stacked on the composite panel;
   forming a radius of curvature on at least one side of the initial radius filler;
   positioning a composite stiffener on the composite panel, wherein the composite stiffener is contoured to define a radius gap when joined with the composite panel;
   positioning the composite stiffener against the at least one side of the initial radius filler;
   compressing the composite panel and the composite stiffening member together via consolidation pressure; and
   heating the initial radius filler to at least one of a cure temperature, a melting temperature, or a fusing temperature to form, from the initial radius filler, a radius gap filler in the radius gap;
   wherein forming the radius of curvature includes size-reducing the at least one side of the initial radius filler.

2. The method of claim 1, wherein forming the initial radius filler includes co-forming the composite panel and the initial radius filler from plies of composite material on the same tool.

3. The method of claim 2, wherein at least one ply of the initial radius filler is positioned between two plies of the composite panel.

4. The method of claim 2, wherein at least one ply of the composite panel and of the initial radius filler have different fiber orientations relative to each other.

5. The method of claim 1, wherein at least one ply of the initial radius filler has a different fiber orientation relative to the other plies of the initial radius filler.

6. The method of claim 1, wherein forming the radius of curvature includes offsetting the stacking of the plurality of plies.

7. The method of claim 1, wherein forming the initial radius filler includes:
   laying down a first group of plies in a first stack on the composite panel; and
   laying down a second group of plies in a second stack on the first group of plies, wherein the plies in the second group have a lesser width than the plies in the first group.

8. The method of claim 1, wherein forming the initial radius filler includes performing automated fiber placement of the plurality of plies of composite material.

9. The method of claim 1, wherein forming the initial radius filler includes forming the plurality of plies from continuous strips of composite material.

10. A method of manufacturing a composite part, the method comprising:
    forming an initial radius filler on a composite panel, wherein the initial radius filler is formed from a plurality of plies of composite material stacked on the composite panel;
    forming a radius of curvature on at least one side of the initial radius filler;
    positioning a composite stiffener on the composite panel, wherein the composite stiffener is contoured to define a radius gap when joined with the composite panel;
    positioning the composite stiffener against the at least one side of the initial radius filler;
    compressing the composite panel and the composite stiffening member together via consolidation pressure; and
    heating the initial radius filler to at least one of a cure temperature, a melting temperature, or a fusing temperature to form, from the initial radius filler, a radius gap filler in the radius gap;
    wherein forming the initial radius filler includes forming the plurality of plies from continuous strips of composite material;
    wherein the continuous strips include unidirectional fibers oriented in the length dimension of the radius gap filler.

11. A method of manufacturing a composite part, the method comprising:
    determining an install location for at least one stiffener on a composite panel;
    forming an initial radius filler at the install location on the composite panel, wherein the initial radius filler is formed from a plurality of plies of composite material;
    positioning a composite stiffener on the composite panel, wherein the composite stiffener is contoured to define a radius gap when joined with the composite panel;
    using the initial radius filler to position the composite stiffener at the install location;
    compressing the composite panel and the composite stiffening member together via consolidation pressure;
    heating the initial radius filler to at least one of a cure temperature, a melting temperature, or a fusing temperature to form, from the initial radius filler, a radius gap filler in the radius gap;
    forming a radius of curvature on at least one side of the initial radius filler, wherein the composite stiffener is positioned against the at least one side of the initial radius filler
    wherein forming the radius of curvature includes size-reducing the at least one side of the initial radius filler to a pre-formed shape.

12. The method of claim 11, wherein forming the radius of curvature includes laying down a subsequently laid ply of composite material at an offset from at least one previously laid ply of composite material.

* * * * *